United States Patent
Li et al.

(10) Patent No.: US 10,911,713 B2
(45) Date of Patent: Feb. 2, 2021

(54) VIDEO DISPLAYING METHOD, VIDEO DISPLAYING APPARATUS, AND COMPUTER-PROGRAM PRODUCT

(71) Applicants: BOE TECHNOLOGY GROUP CO., LTD., Beijing (CN); JIAXING SEC-VIEW INFORMATION TECHNOLOGY CO., LTD, Zhejiang (CN)

(72) Inventors: Yingyi Li, Beijing (CN); Kairan Liu, Beijing (CN); Wenbo Li, Beijing (CN); Lin Zhu, Beijing (CN); Guangtao Zhai, Zhejiang (CN)

(73) Assignees: BOE TECHNOLOGY GROUP CO., LTD., Beijing (CN); JIAXING SEC-VIEW INFORMATION TECHNOLOGY CO., LTD, Zhejiang (CN)

( * ) Notice: Subject to any disclaimer, the term of this patent is extended or adjusted under 35 U.S.C. 154(b) by 0 days.

(21) Appl. No.: 16/465,819

(22) PCT Filed: Nov. 19, 2018

(86) PCT No.: PCT/CN2018/116183
§ 371 (c)(1),
(2) Date: May 31, 2019

(87) PCT Pub. No.: WO2019/137097
PCT Pub. Date: Jul. 18, 2019

(65) Prior Publication Data
US 2020/0244919 A1   Jul. 30, 2020

(30) Foreign Application Priority Data

Jan. 12, 2018   (CN) .......................... 2018 1 0032597

(51) Int. Cl.
   *H04N 5/913*   (2006.01)
   *H04N 9/31*   (2006.01)
(52) U.S. Cl.
   CPC .......... *H04N 5/913* (2013.01); *H04N 9/3179* (2013.01); *H04N 2005/91307* (2013.01)
(58) Field of Classification Search
   None
   See application file for complete search history.

(56) References Cited

U.S. PATENT DOCUMENTS

| 6,046,716 A * | 4/2000 | McKnight ............ G09G 3/2011 345/208 |
| 2001/0043177 A1* | 11/2001 | Huston ................ G09G 3/3648 345/87 |

(Continued)

FOREIGN PATENT DOCUMENTS

| CN | 101031090 A | 9/2007 |
| CN | 101622867 A | 1/2010 |

(Continued)

OTHER PUBLICATIONS

International Search Report & Written Opinion dated Jan. 30, 2019, regarding PCT/CN2018/116183.

(Continued)

*Primary Examiner* — Chikaodili E Anyikire
(74) *Attorney, Agent, or Firm* — Intellectual Valley Law, P.C.

(57) ABSTRACT

A video displaying method. The method includes applying a first frequency modulation in time domain on an original video thereby obtaining a first modulated video; applying a second frequency modulation in spatial domain on the first modulated video thereby obtaining a second modulated video including a first invisible-light image; and displaying the second modulating video with a corresponding frame rate. A time-domain frequency of the first invisible-light (Continued)

image is in a first range unrecognizable by a naked eye and recognizable by a video recorder. A spatial-domain frequency of the first invisible-light image is in a second range unrecognizable by the naked eye and recognizable by a video recorder.

18 Claims, 6 Drawing Sheets

(56) References Cited

U.S. PATENT DOCUMENTS

| | | | | |
|---|---|---|---|---|
| 2007/0212024 A1* | 9/2007 | Bourdon | ............... | H04N 5/913 386/304 |
| 2010/0039568 A1* | 2/2010 | Tchoukaleysky | .... | H04N 9/3179 348/720 |
| 2010/0134630 A1* | 6/2010 | Yoon | ....................... | H04N 5/74 348/164 |
| 2012/0019462 A1* | 1/2012 | Kim | ..................... | G06F 3/0386 345/173 |
| 2015/0304522 A1* | 10/2015 | Van Herpen | ....... | H04N 21/4627 380/210 |
| 2016/0164603 A1* | 6/2016 | De Bruijn | ............ | H04B 10/116 398/118 |

FOREIGN PATENT DOCUMENTS

| | | |
|---|---|---|
| CN | 101689992 A | 3/2010 |
| CN | 104869476 A | 8/2015 |
| CN | 106407827 A | 2/2017 |
| EP | 1237369 A2 | 9/2002 |
| EP | 1936975 A1 | 6/2008 |
| WO | 2007028796 A1 | 3/2007 |

OTHER PUBLICATIONS

First Office Action in the Chinese Patent Application No. 201810032597.6, dated Apr. 3, 2019; English translation attached.

Second Office Action in the Chinese Patent Application No. 201810032597.6, dated Sep. 24, 2019; English translation attached.

\* cited by examiner

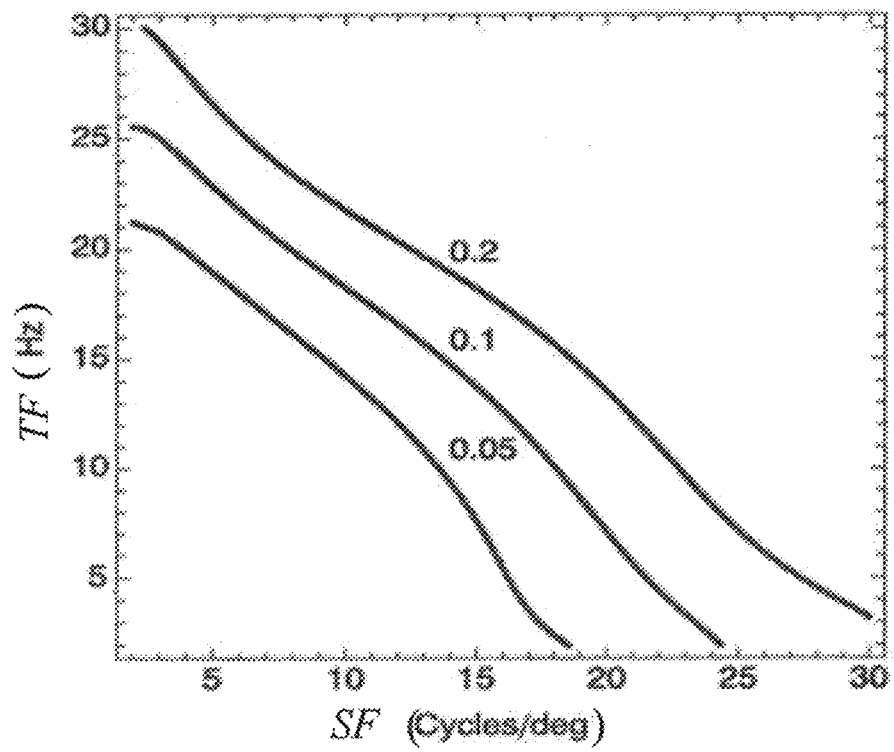

Performing N numbers of times frequency multiplication on the original video to obtain a third modulated video having a video frame rate in a third range

↓

Wherein N ≥ 2; the video frame rate is N times a video frame rate of the original video, a respective one of frame images in the original video being converted into N numbers of continuous sub-frame images.

FIG. 6

Dividing frame images in the third modulated video into N equivalent groups of frame images, the N numbers of continuous sub-frame images converted from a respective one of the frame images of the original video are respectively grouped into the N equivalent groups of frame images

↓

Superimposing N numbers of first images respectively onto the N equivalent groups of frame images, the N numbers of first images being different from each other

FIG. 7

Dividing frame images in the third video into M groups of frame images, a respective one of the M groups of frame images comprising the N numbers of continuous sub-frame images converted from a respective one of the frame images of the original video

↓

Replacing one sub-frame images of the N numbers of continuous sub-frame images in the respective one of the M groups of frame images with a respective one of M numbers of first images

FIG. 8

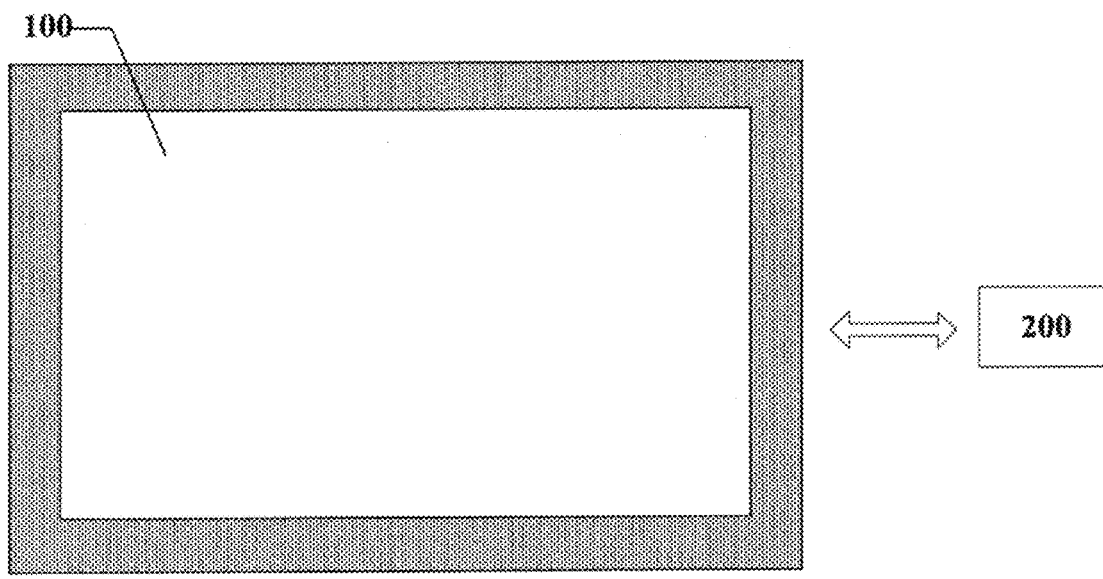

FIG. 9

VIDEO DISPLAYING METHOD, VIDEO DISPLAYING APPARATUS, AND COMPUTER-PROGRAM PRODUCT

CROSS-REFERENCE TO RELATED APPLICATION

This application is a national stage application under 35 U.S.C. § 371 of International Application No. PCT/CN2018/116183, filed Nov. 19, 2018, which claims priority to Chinese Patent Application No. 201810032597.6, filed Jan. 12, 2018, the contents of which are incorporated by reference in the entirety.

TECHNICAL FIELD

The present invention relates to display technology, more particularly, to a video displaying method, a video displaying apparatus, and a computer-program product thereof.

BACKGROUND

As the technological development of the mobile devices, some small portable devices have the camera function for taking photos or taking videos. Therefore, taking a photo or taking a video becomes more and more convenient. For example, people can easily use the mobile devices such as digital cameras, smart phones, pads and so on to take a photo anywhere and anytime. As the camera function of the mobile devices becomes more advanced, it brings security risks to image data played on screens. Currently, the measures adopted to prevent people from pirating the image data includes prohibiting viewers from taking photos when documents or videos are displayed, or sending alerts when people is taking videos. However, above-mentioned measures are relatively passive, which cannot completely prevent piracy behavior.

SUMMARY

In one aspect, the present invention provides a video displaying method, comprising applying a first frequency modulation in time domain on an original video thereby obtaining a first modulated video; applying a second frequency modulation in spatial domain on the first modulated video thereby obtaining a second modulated video comprising a first invisible-light image; and displaying the second modulating video with a corresponding frame rate; wherein a time-domain frequency of the first invisible-light image is in a first range unrecognizable by a naked eye and recognizable by a video recorder; and a spatial-domain frequency of the first invisible-light image is in a second range unrecognizable by the naked eye and recognizable by a video recorder.

Optionally, the first range is greater than a maximum time-domain frequency recognizable by the naked eye, and is within a range of time-domain frequency recognizable by a video recorder, and the second range is greater than a maximum spatial-domain frequency recognizable by the naked eye, and is within a range of spatial-domain frequency recognizable by the video recorder.

Optionally, applying the first frequency modulation comprises performing N numbers of times frequency multiplication on the original video to obtain a third modulated video having a video frame rate in a third range; wherein N≥2; the video frame rate is N times a video frame rate of the original video; and a respective one of frame images in the original video is converted into N numbers of continuous sub-frame images.

Optionally, the third range is greater than a maximum video frame rate recognizable by the naked eye and within a range recognizable by the video recorder.

Optionally, applying the second frequency modulation comprises dividing frame images in the third modulated video into N equivalent groups of frame images, the N numbers of continuous sub-frame images converted from the respective one of the frame images of the original video are respectively grouped into the N equivalent groups of frame images; and superimposing N numbers of first images respectively onto the N equivalent groups of frame images, the N numbers of first images being different from each other; wherein a superimposed image of adjacent first images of the N numbers of first images constitutes a background image of a single grayscale and a single color; and a respective one of the N numbers of first images has a spatial-domain frequency in the second range.

Optionally, the second range is greater than a maximum spatial-domain frequency recognizable by the naked eye, and is within a range of spatial-domain frequency recognizable by the video recorder.

Optionally, applying the second frequency modulation comprises dividing frame images in the third modulated video into M groups of frame images, a respective one group of the M groups of frame images comprising the N continuous sub-frame images converted from a respective one of the frame images of the original video; and replacing one sub-frame images of the N continuous sub-frame images in the respective one group of the M groups of frame images with a respective one of M numbers of first images; wherein M is a total number of frame images in the original video; the M numbers of first images being different from each other, sub-images of any two different groups of the M groups of frame images being replaced by two different first images of the M numbers of first images; wherein a superimposed image of adjacent first images of the M numbers of first images constitutes a background image of a single grayscale and a single color, and the respective one of the M numbers of first images has a spatial-domain frequency in the second range.

Optionally, the second range is greater than a maximum spatial-domain frequency recognizable by the naked eye, and is within a range of spatial-domain frequency recognizable by the video recorder.

Optionally, displaying the second modulated video with the corresponding frame rate comprises displaying the second modulated video according to a video frame sequence and the video frame rate of the third modulated video.

Optionally, the video displaying method further comprises simultaneously projecting a modulation light onto a video image when displaying the second modulated video; wherein a time-domain frequency of the modulation light is in a range unrecognizable by the naked eye and recognizable by a video recorder, and a spatial-domain frequency of the modulation light is in a range unrecognizable by the naked eye and recognizable by a video recorder.

Optionally, the time-domain frequency of the modulation light is greater than a maximum time-domain frequency recognizable by the naked eye, and is within a range of time-domain frequency recognizable by a video recorder; and the spatial-domain frequency of the modulation light is greater than a maximum spatial-domain frequency recognizable by the naked eye, and is within a range of spatial-domain frequency recognizable by the video recorder.

Optionally, the time-domain frequency of the first invisible-light image is greater than 24 Hz.

Optionally, the first range is approximately 300 Hz to approximately 400 Hz.

Optionally, the second range is approximately 60 c/deg to approximately 200 c/deg.

Optionally, the first invisible-light image is one or a combination of a word, a stripe, and a two-dimensional barcode.

In another aspect, the present invention provides a video displaying apparatus, comprising a display apparatus; a memory; and one or more processors; wherein the memory and the one or more processors are connected with each other; and the memory stores computer-executable instructions for controlling the one or more processors to apply a first frequency modulation in time domain on an original video thereby obtaining a first modulated video; and apply a second frequency modulation in spatial domain on the first modulated video thereby obtaining a second modulated video comprising a first invisible-light image; wherein a time-domain frequency of the first invisible-light image is in a first range unrecognizable by a naked eye and recognizable by a video recorder; and a spatial-domain frequency of the first invisible-light image is in a second range unrecognizable by the naked eye and recognizable by a video recorder; wherein the display apparatus is configured to play the second modulating video with a corresponding frame rate.

Optionally, the memory further stores computer-executable instructions for controlling the one or more processors to apply the first frequency modulation comprises performing N numbers of times frequency multiplication on the original video to obtain a third modulated video having a video frame rate in a third range; N≥2; the video frame rate is N times a video frame rate of the original video; and a respective one of frame images in the original video is converted into N numbers of continuous sub-frame images.

Optionally, the memory further stores computer-executable instructions for controlling the one or more processors to divide frame images in the third modulated video into N equivalent groups of frame images, the N numbers of continuous sub-frame images converted from the respective one of the frame images of the original video are respectively grouped into the N equivalent groups of frame images; and superimpose N numbers of first images respectively onto the N equivalent groups of frame images, the N numbers of first images being different from each other; wherein a superimposed image of adjacent first images of the N numbers of first images constitutes a background image of a single grayscale and a single color; and a respective one of the N numbers of first images has a spatial-domain frequency in the second range.

Optionally, the memory further stores computer-executable instructions for controlling the one or more processors to divide frame images in the third modulated video into M groups of frame images, a respective one group of the M groups of frame images comprising the N continuous sub-frame images converted from a respective one of the frame images of the original video; and replace one sub-frame images of the N continuous sub-frame images in the respective one group of the M groups of frame images with a respective one of M numbers of first images; wherein M is a total number of frame images in the original video; the M numbers of first images being different from each other, sub-images of any two different groups of the M groups of frame images being replaced by two different first images of the M numbers of first images; wherein a superimposed image of adjacent first images of the M numbers of first images constitutes a background image of a single grayscale and a single color; and the respective one of the M numbers of first images has a spatial-domain frequency in the second range.

In another aspect, the present invention provides a computer-program product comprising a non-transitory tangible computer-readable medium having computer-readable instructions thereon, the computer-readable instructions being executable by a processor to cause the processor to perform applying a first frequency modulation in time domain on an original video thereby obtaining a first modulated video; and applying a second frequency modulation in spatial domain on the first modulated video thereby obtaining a second modulated video comprising a first invisible-light image; wherein a time-domain frequency of the first invisible-light image is in a first range unrecognizable by a naked eye and recognizable by a video recorder; and a spatial-domain frequency of the first invisible-light image is in a second range unrecognizable by the naked eye and recognizable by a video recorder.

BRIEF DESCRIPTION OF THE FIGURES

The following drawings are merely examples for illustrative purposes according to various disclosed embodiments and are not intended to limit the scope of the present invention.

FIG. 1 is a flow chart illustrating a video displaying method in some embodiments according to the present disclosure.

FIG. 2 is a curve illustrating relationships between time-domain frequency and spatial-domain frequency in some embodiments according to the present disclosure.

FIG. 6 is a flow chart illustrating a video displaying method in some embodiments according to the present disclosure.

FIG. 7 is a flow chart illustrating a video displaying method in some embodiments according to the present disclosure.

FIG. 8 is a flow chart illustrating a video displaying method in some embodiments according to the present disclosure.

FIG. 9 is a schematic diagram illustrating a structure of a video displaying apparatus in some embodiments according to the present disclosure.

DETAILED DESCRIPTION

Figure 3A:
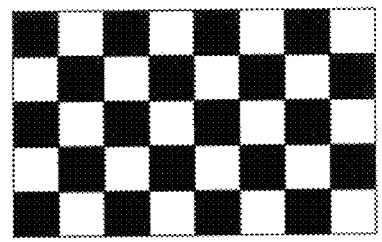
FIGS. 3A and 3B are schematic diagrams illustrating frame images played by a video player in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a video displaying method, a video displaying apparatus, and a computer-program product thereof that substantially obviate one or more of the problems due to limitations and disadvantages of the related art. In one aspect, the present disclosure provides a video displaying method. In some embodiments, the video displaying method includes applying a first frequency modulation in time domain on an original video thereby obtaining a first modulated video; applying a second frequency modulation in spatial domain on the first modulated video thereby obtaining a second modulated video comprising a first invisible-light image (e.g., invisible to a naked eye); and displaying the second modulating video with a corresponding frame rate. Optionally, a time-domain frequency of the first invisible-light image is in a first range unrecognizable by the naked eye and recognizable by a video recorder. Optionally, a spatial-domain frequency of the first invisible-light image is in a second range unrecognizable by the naked eye and recognizable by a video recorder. Examples of invisible-light image include infra-red light images and ultraviolet light images.

FIG. 1 is a flow chart illustrating a video displaying method in some embodiments according to the present disclosure. Referring to FIG. 1, the video displaying method includes applying a first frequency modulation in time domain on an original video thereby obtaining a first modulated video, applying a second frequency modulation in spatial domain on the first modulated video thereby obtaining a second modulated video comprising a first invisible-light image, and displaying the second modulating video with a corresponding frame rate.

In some embodiments, a time-domain frequency of the first invisible-light image is in a first range unrecognizable by the naked eye and recognizable by a video recorder. Optionally, the first range is greater than a maximum time-domain frequency recognizable by the naked eye. For example, the time-domain frequency recognizable by the naked eye is less than approximately 30 Hz, e.g., less than approximately 24 Hz. Therefore, the first range is in a rang greater than approximately 24 Hz, e.g. greater than approximately 30 Hz, greater than approximately 40 Hz, greater than approximately 50 Hz, greater than approximately 60 Hz, greater than approximately 100 Hz, greater than approximately 200 Hz, and greater than approximately 300 Hz. Optionally, the first range is within a range of time-domain frequency recognizable by a video recorder. For example, the time-domain frequency recognizable by a video recorder is in a range of approximately 24 Hz to approximately 100000 Hz, e.g., approximately 30 Hz to approximately 100000 Hz, approximately 60 Hz to approximately 50000 Hz, approximately 100 Hz to approximately 10000 Hz, approximately 200 Hz to approximately 5000 Hz, approximately 300 Hz to approximately 1000 Hz, and approximately 300 Hz to approximately 400 Hz. In some embodiments, a spatial-domain frequency of the first invisible-light image is in a second range unrecognizable by the naked eye and recognizable by a video recorder. Optionally, the second range is greater than a maximum spatial-domain frequency recognizable by the naked eye. For example, the spatial-domain frequency recognizable by the naked eye is less than 300 PPI. Therefore, the second range is in a range greater than approximately 300 PPI, e.g. greater than approximately 400 PPI, greater than approximately 500 PPI, greater than approximately 600 PPI, greater than approximately 700 PPI, greater than approximately 800 PPI, greater than approximately 900 PPI, and greater than approximately 1000 PPI. Optionally, the second range is within a range of spatial-domain frequency recognizable by the video recorder. For example, the spatial-domain frequency recognizable by a video recorder is in a range of approximately 300 PPI to approximately 10000 PPI, e.g. approximately 400 PPI to approximately 10000 PPI, approximately 500 PPI to approximately 10000 PPI, approximately 600 PPI to approximately 10000 PPI, approximately 700 PPI to approximately 10000 PPI, approximately 800 PPI to approximately 10000 PPI, approximately 900 PPI to approximately 10000 PPI, and approximately 1000 PPI to approximately 10000 PPI.

In general, a video stream can be described by the following function:

$$l(x,t)=(((m(x,t)*o(x))*a(t))g(t))*f(t)*h(t) \quad (1);$$

wherein $l(x, t)$ represents the ultimate display result, $m(x, t)$ represents a vertical line scanning from left to right at a uniform speed, $o(x)$ represents the width of the vertical line relating to optical parameters of a video recorder. The convolution of the three functions $l(x,t)*m(x,t)*o(x)$ represents a first sampling process.

To further illustrate, $a(t)$ represents a prefilter function, which means a decrease in the display frame rate when comparing the ultimate display result with the images obtained from the first sampling process. $g(t)$ represents downsampling, i.e. a second sampling process after prefiltering. In the conventional technology of video displaying, every frame image is played multiple times (generally two to three times) to avoid image flickering, and $f(t)*h(t)$ represent the result of displaying every frame image multiple times.

Subsequent to apply the Fourier Transform to Equation (1), Equation (1) is converted into Equation (2), represented by time-domain frequency and spatial-domain frequency:

$$L(u,w)=(((M(u,w)O(u))A(w))*G(w))F(w)H(w) \quad (2);$$

wherein u represents spatial-domain frequency (unit: cpd), w represents time-domain frequency (unit: Hz).

According to Equation (2) a sensitivity of a naked eye to an artifact image can be pre-determined based on the visual sensitivity of the naked eye. FIG. 2 is a curve illustrating relationship between time-domain frequency and spatial-domain frequency in some embodiments according to the present disclosure. Referring to FIG. 2, the three curves in FIG. 2 illustrate relationships between time-domain frequency and spatial-domain frequency when the normalized thresholds of the International Standards Organization (ISO) sensitivity is set at 0.05, 0.1 and 0.2, respectively. The X-axis is spatial-domain frequency SF (unit: cycles per degree or cpd), and Y-axis is time-domain frequency TF (unit: Hz). For example, the curve corresponding to 0.05 ISO sensitivity shows the visual sensitivity of the viewer or a video recorder with 0.05 ISO sensitivity. The artifact image having various combinations of the time-domain frequencies and spatial-domain frequencies can be detected by a viewer or a video recorder with 0.05 ISO sensitivity. As shown in FIG. 2, the visual sensitivity curve is approximately a linear curve, e.g., the relationship between the time-domain frequency and spatial-domain frequency corresponding to a same visual sensitivity has an approximately linear relationship. The time-domain frequencies corresponding to a same visual sensitivity (e.g., 0.05 ISO sensitivity) is within a limit, and the spatial-domain frequencies corresponding to a same visual sensitivity (e.g., 0.05 ISO sensitivity) is within a limit. According, a "Window of Visibility (WOV)" can be used to define a time-domain frequency range and a spatial-domain frequency range, within which a naked eye or a video recorder can recognize an image. For example, a naked eye or a video recorder can see a whole image and recognize the boundary of the image within the window of visibility, whereas the naked eye or the video recorder cannot recognize a whole image outside the window of visibility.

Figure 3B:
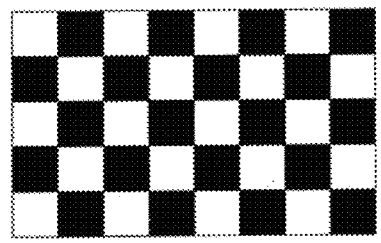
Figure 4:
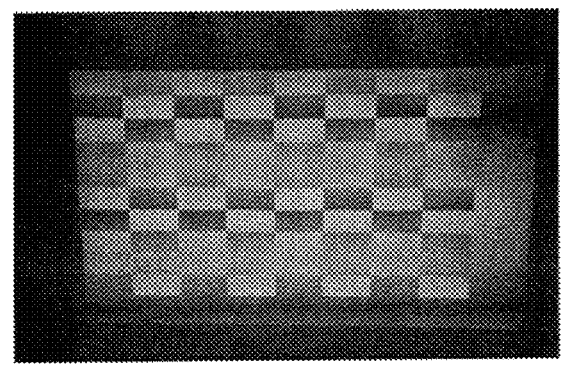
FIG. 4 is a schematic diagram illustrating the images shot by a video recorder.

FIGS. 3A and 3B are schematic diagrams illustrating frames played by a video player in some embodiments according to the present disclosure. FIG. 4 is a schematic diagram illustrating the images shot by a video recorder. Referring to FIG. 3A and FIG. 3B, they are two complementary checkerboard images (black patterns in one image corresponding to white patterns in another image at corresponding positions). In one example, the video player keeps displaying FIG. 3A and FIG. 3B alternately with a frame rate. When the frame rate is sufficiently high, the image detected by a viewer is an image having a substantially uniform grayscale. However, as shown in FIG. 4, a video recorder is capable of detecting an artifact image when viewing the image played by the video player at the sufficiently high frame rate. Thus, WOVs of the naked eye and the video recorder are different from each other. A range of WOV of the video recorder is greater than a range of WOV of the naked eye. The video recorder can recognize a WOV having a time-domain frequency range and a spatial-domain frequency range, that is outside the WOV recognizable by the naked eye.

Figure 5:
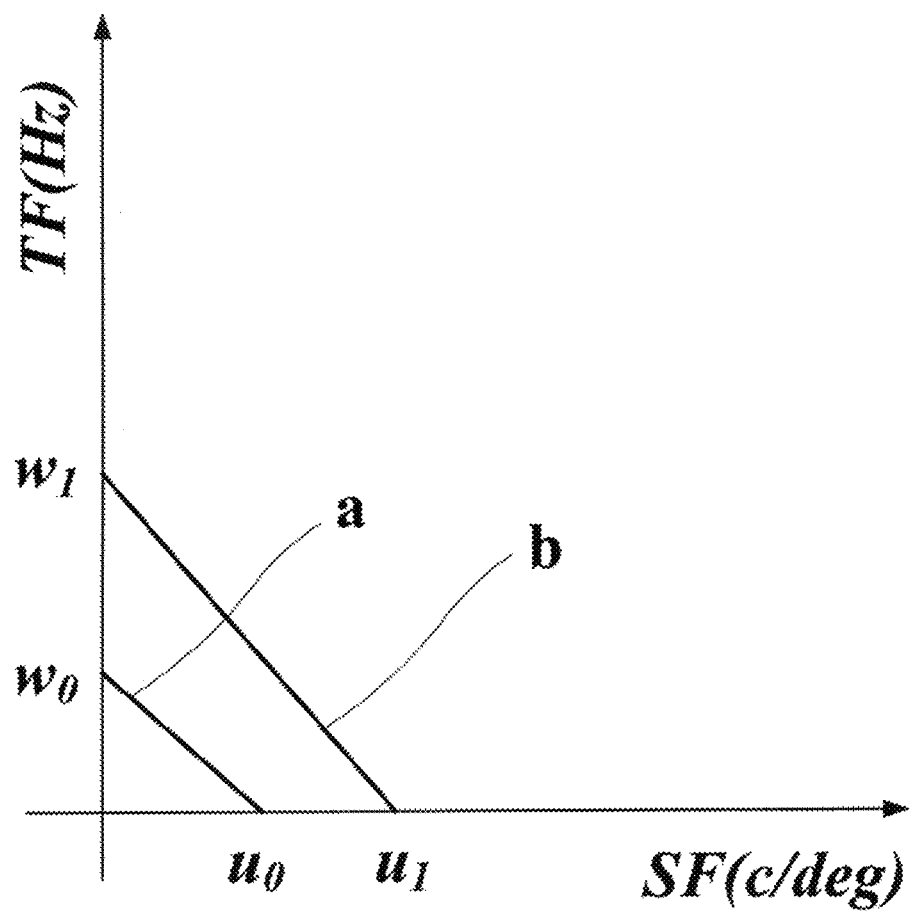
FIG. 5 is a curve illustrating relationships between time-domain frequency and spatial-domain frequency in some embodiments according to the present disclosure.

FIG. 5 is a curve illustrating relationships between time-domain frequency and spatial-domain frequency in some embodiments according to the present disclosure. Referring to FIG. 5, the WOV of the naked eye and the WOV of the video recorder are shown. Curve a shows the range of the WOV of the naked eye in different time-domain frequency and spatial-domain frequency, wherein us is a maximum spatial-domain frequency; we is a maximum time-domain frequency. Curve b shows the range of the WOV of the video recorder in different time-domain frequency and spatial-domain frequency, wherein, $u_1$ is a maximum spatial-domain frequency; $w_1$ is a maximum time-domain frequency. Outside the time-domain frequency range and the spatial-domain frequency range recognizable by the naked eye, any image becomes unrecognizable by the naked eye. Beyond the time-domain frequency range and the spatial-domain frequency range recognizable by the video recorder, any image is unrecognizable by the video recorder. Within the time-domain frequency range and the spatial-domain frequency range recognizable by the naked eye, any image is recognizable by the naked eye. Within the time-domain frequency range and the spatial-domain frequency range recognizable by the video recorder, any image is recognizable by the video recorder. Referring to FIG. 5, within the area between the curve a and the curve b, images are unrecognizable by the naked eye but recognizable by the video recorder.

In some embodiments, the present disclosure provides a video displaying method, including applying a first frequency modulation in time domain on an original video thereby obtaining a first modulated video; applying a second frequency modulation in spatial domain on the first modulated video thereby obtaining a second modulated video including a first invisible-light image; and displaying the second modulating video with a corresponding frame rate. Optionally a time-domain frequency of the first invisible-light image is in a first range unrecognizable by the naked eye and recognizable by a video recorder. For example, the first range is greater than a maximum time-domain frequency recognizable by the naked eye, but within a range of time-domain frequency recognizable by a video recorder. Optionally, a spatial-domain frequency of the first invisible-light image is in a second range unrecognizable by the naked eye and recognizable by a video recorder. For example, the second range is greater than a maximum spatial-domain frequency recognizable by the naked eye, but within a range of spatial-domain frequency recognizable by the video recorder.

Because the time-domain frequency of the first invisible-light image and the spatial-domain frequency of the first invisible-light image are respectively greater than the maximum time-domain frequency recognizable by the naked eye and the maximum spatial-domain frequency recognizable by the naked eye, but within the range of time-domain frequency recognizable by a video recorder and the range of spatial-domain frequency recognizable by the video recorder, the naked eye cannot recognize the first invisible-light image when the video is played. However, when the video recorder records an image played by the video player, the video recorder records a video having the first invisible-light image. Thus, when a viewer is viewing the video, the clarity of the modulated video viewed by the viewer is maintained at substantially a same level as the original video. When a video recorder is recording the same video, an artifact image will be recorded. The present method prevents the original video from being pirated by video recorders, which guarantees the safety of the contents of the original video.

FIG. 6 is a flow chart illustrating a video displaying method in some embodiments according to the present disclosure. Referring to FIG. 6, applying a first frequency modulation in time domain on an original video thereby obtaining a first modulated video includes performing N numbers of times frequency multiplication on the original video to obtain a third modulated video having a video frame rate in a third range. Optionally, the third range is greater than a maximum time-domain frequency recognizable by the naked eye. For example, the time-domain frequency recognizable by the naked eye is less than approximately 30 Hz, e.g., less than approximately 24 Hz. Therefore, the first range is in a rang greater than approximately 24 Hz, e.g. greater than approximately 30 Hz, greater than approximately 40 Hz, greater than approximately 50 Hz, greater than approximately 60 Hz, greater than approximately 100 Hz, greater than approximately 200 Hz, and greater than approximately 300 Hz. Optionally, the third range is within the range of time-domain frequency recognizable by the video recorder. For example, the time-domain frequency recognizable by a video recorder is in a range of approximately 24 Hz to approximately 100000 Hz, e.g., approximately 30 Hz to approximately 100000 Hz, approximately 60 Hz to approximately 50000 Hz, approximately 100 Hz to approximately 10000 Hz, approximately 200 Hz to approximately 5000 Hz, approximately 300 Hz to approximately 1000 Hz, and approximately 300 Hz to approximately 400 Hz. Optionally, subsequent to performing N numbers of times frequency multiplication on the original video, wherein N≥2 (e.g., N is positive integer), the video frame rate of the third modulated video is N times a video frame rate of the original video, a respective one of frame images in the original video being converted into N numbers of continuous sub-frame images.

In some embodiments, in order to obtain a first invisible-light image in a third modulated video, the time-domain frequency of the first invisible-light image is greater than a maximum time-domain frequency recognizable by the naked eye. In some embodiments, performing N numbers of times frequency multiplication on the original video to obtain the third modulated video having the video frame rate in the third range includes setting the third range to meet the condition to perform frequency modulation in spatial domain. In some embodiments, the way to play the third modulated video is different from the way to play the original video. For example, a video frame rate of the original video is 60 Hz, therefore the original video contains 60 images (a1, a2, a3, . . . , a60). Those 60 images are continuously played in sequence and each of the 60 images is played per second. Optionally, subsequent to perform 2 times frequency multiplication on the original video, the third modulated video contains 120 images. Each of the frame images in the original video is now converted into 2 continuous sub-frame images. There are 60 sets of 2 continuous sub-frame images. Therefore, each set of two continuous sub-frame images is played prior to the next set of two continuous sub-frame images, which is equivalent to that each of frame images in the original video is played twice. For example, the sequence of displaying the third modulated video is a1, a1, a2, a2, a3, a3, . . . , a60, a60. Optionally, subsequent to perform 2 times frequency multiplication on the original video, the video displaying speed of the third modulated video is twice the video displaying speed of the original video, so that the viewing experience of the third modulated video is the same as the one of the original video. Also, the video frame rate of the third modulated video is twice the video frame rate of the original video.

FIG. 7 is a flow chart illustrating a video displaying method in some embodiments according to the present disclosure. Referring to FIG. 7, applying a second frequency modulation includes dividing frame images in the third modulated video into N equivalent groups of frame images, the N numbers of continuous sub-frame images converted from a respective one of the frame images of the original video are respectively grouped into the N equivalent groups of frame images; superimposing N numbers of first images respectively onto the N equivalent groups of frame images, the N numbers of first images being different from each other. Optionally, a superimposed image of adjacent first images of the N numbers of first images constitutes a background image of a single grayscale and a single color. In one example, a superimposed image of any two adjacent first images of the N numbers of first images constitutes a background image of a single grayscale and a single color. In another example, a superimposed image of the N numbers of first images constitutes a background image of a single grayscale and a single color. Optionally, a respective one of the N numbers of first images has a spatial-domain frequency in the second range. Optionally, the second range is greater than a maximum spatial-domain frequency recognizable by the naked eye. Optionally, the second range is within a range of spatial-domain frequency recognizable by the video recorder.

In one example, the original video contains 60 frame images and the frame rate of the original video is 60 Hz. Subsequent to performing 2 times frequency multiplication on the original video, a third modulated video is obtained. Therefore, the frame images of the third modulated video are played in sequence of a1, a1, a2, a2, a3, a3, . . . , a60, a60, which means that each of frame images in the original video is converted into 2 continuous sub-frame images. Optionally, the 2 continuous sub-frame images converted from each of the frame images of the original video are respectively grouped into the 2 equivalent groups of frame images. Therefore, a first group of the 2 equivalent groups of frame images contain a1, a2, a3, . . . , a60. And a second group of the 2 equivalent groups of frame images contain a1, a2, a3, . . . , a60. Therefore, the 2 equivalent groups of frame images contain same numbers of the frame images (e.g. both have 60 frame images), and the 2 equivalent groups of frame images contain same frame images (e.g. both have a1, a2, a3, . . . , a60). However, the frame images of each of the 2 equivalent groups of frame images are different from each other. For example, subsequent to performing 2 times frequency multiplication on the original video, the frame images of the third modulated video are played in sequence of a1, a1, a2, a2, a3, a3, . . . , a60, a60. Therefore, the first group of the 2 equivalent groups of frame images contain the first frame image, the third frame image, the fifth frame image, . . . , and the $119^{th}$ frame image. And the second group of the 2 equivalent groups of frame images contain the second frame image, the fourth frame image, the sixth frame image, . . . , and the $120^{th}$ frame image.

In another example, applying the same second frequency modulation on both the 2 equivalent groups of frame images in spatial domain including superimposing b1 of the first images to each frame image of the first group of the 2 equivalent groups of frame images, thereby obtaining a superimposed first group of the 2 equivalent groups of frame images including a1+b1, a2+b1, a3+b1, . . . , a60+b1; superimposing b2 of the first images to each frame images of the second group of the 2 equivalent groups of frame images, thereby obtaining a superimposed first group of the 2 equivalent groups of frame images including a1+b2, a2+b2, a3+b2, . . . , a60+b2; wherein b1 and b2 belongs to the first images. Optionally, the patterns of b1 and b1 are distributed in different spatial area. Optionally, superimposing b1 and b2 to each other forms a background image of a single grayscale and a single color. Optionally, b1 and b2 has a spatial-domain frequency in the second range. For example, the second range is greater than a maximum spatial-domain frequency recognizable by the naked eye. In another example, the second range is within a range of spatial-domain frequency recognizable by the video recorder.

Since the naked eye has a cumulative effect when viewing images, the result of viewing a video is formed by the cumulative effect of viewing frame images continuously played. Therefore, subsequent to performing the third frequency modulation in time domain and the second frequency modulation in spatial domain on an original video thereby obtaining the second modulated video, the frame images of the second modulated video viewed by naked eye includes a1+b1, a1+b2, a2+b1, a2+b2, a3+b1, a3+b2, . . . , a60+b1, a60+b2. Because of the cumulative effect on the naked eye, b1 and b2 forms a background image of a single grayscale and a single color. Optionally, b1 and b2 has a time-domain frequency in the third range. For example, the third range is greater than a maximum time-domain frequency recognizable by the naked eye. In another example, the third range is within a range of time-domain frequency recognizable by the video recorder. Optionally, b1 and b2 has a spatial-domain frequency in the second range. For example, the second range is greater than a maximum spatial-domain frequency recognizable by the naked eye. In another example, the second range is within a range of spatial-domain frequency recognizable by the video recorder. Therefore, the second modulated video viewed by the naked eye is the original video superimposed by a background image of a single grayscale and a single color, the naked eye cannot recognize any superimposed first images (e.g. b1 or b2). Therefore, the second modulated video does not have any effect on viewer's viewing experience. However, for video recorder which can recognize images in a wider range of time-domain frequency and a wider range of spatial-domain frequency, b1 and b2 has a time-domain frequency in the third range which is within a range of time-domain frequency recognizable by the video recorder, and b1 and b2 has a spatial-domain frequency in the second range which is within a range of spatial-domain frequency recognizable by the video recorder. Therefore, when the video recorder records the second modulated video, it can record the artifact images of first images (e.g. b1 or b2). Therefore, the second modulated video does not affect the viewing experience of the naked eye but disturb the recording result of the video recorder, which helps to protect the contents of videos and enhance the security to play video.

FIG. 8 is a flow chart illustrating a video displaying method in some embodiments according to the present disclosure. Referring to FIG. 8, applying the second frequency modulation includes dividing frame images in the third video into M groups of frame images, a respective one group of the M groups of frame images comprising the N numbers of continuous sub-frame images converted from a respective one of the frame images of the original video; and replacing one sub-frame images of the N numbers of continuous sub-frame images in the respective one group of the M groups of frame images with a respective one of M numbers of first images; wherein M is a total number of frame images in the original video. Optionally, the M numbers of first images are different from each other, sub-images of any two different groups of the M groups of frame images are replaced by two different first images of the M numbers of first images. Optionally, a superimposed image of adjacent first images of the M numbers of first images constitutes a background image of a single grayscale and a single color. In one example, a superimposed image of any two adjacent first images of the M numbers of first images constitutes a background image of a single grayscale and a single color. In another example, a superimposed image of the M numbers of first images constitutes a background image of a single grayscale and a single color. In another example, a superimposed image of any numbers of adjacent first images of the M numbers of first images constitutes a background image of a single grayscale and a single color. Optionally, a respective one of the M numbers of first images has a spatial-domain frequency in the second range. Optionally, the second range is greater than a maximum spatial-domain frequency recognizable by the naked eye. Optionally, the second range is within a range of spatial-domain frequency recognizable by the video recorder.

In one example, the original video contains 60 frame images and the frame rate of the original video is 60 Hz. Optionally, subsequent to performing 2 times frequency multiplication on the original video, a third modulated video is obtained. Therefore, the frame images of the third modulated video are played in sequence of a1, a1, a2, a2, a3, a3, ..., a60, a60. Optionally, dividing frame images in the third video into M groups of frame images, wherein M is the total number of frame images in the original video. For example, M=60, the M groups of frame images are respectively (a1, a1), (a2, a2), (a3, a3), ..., (a60, a60). Optionally, each individual one group of the M groups of frame images includes the N numbers of continuous sub-frame images converted from a respective one of the frame images of the original video. For example, N=2, the first one of the M group of frame images (a1, a1) contains 2 continuous sub-frame images converted from a1 of the frame images of the original video. Optionally, each individual one group of the M groups of frame images contains N identical continuous sub-frame images. For example, (a1, a1) contains 2 identical continuous sub-frame images converted from a1 of the frame images of the original video.

In another example, subsequent to replacing one sub-frame images of the N numbers of continuous sub-frame images in each individual one group of the M groups of frame images with a respective one of M numbers of first images, for example, M=60, the replaced M groups of frame images contains (a1, b1), (a2, b2), (a3, b3), ..., (a60, b60), thereby obtaining the second modulated video. Therefore, the second modulated video includes frame images in sequence of a1, b1, a2, b2, a3, b3, ..., a60, b60. Because the original video can be normally viewed by the naked eye, which means the naked eye cannot recognize any artifacts of any frame images of the original video, therefore, the frame rate of the original video is in a time-domain range greater than a maximum time-domain frequency recognizable by the naked eye. Subsequent to performing 2 times frequency multiplication on the original video and applying the second frequency modulation in spatial domain, the second modulated video is obtained. If only the frame images of the original video are extracted from the second modulated video, the frame rate of the extracted frame images of the original video would be 60 Hz. If only the first images are extracted from the second modulated video, the frame rate of the extracted first images is also 60 Hz. Therefore, the frame rate of the abstracted first images is greater than a maximum time-domain frequency recognizable by the naked eye. According to the cumulative effect of the naked eye, a superimposed image of the M numbers of first images constitutes a background image of a single grayscale and a single color. For example, a superimposed image of any numbers (e.g., any two) of adjacent first images of the M numbers of first images constitutes a background image of a single grayscale and a single color. Optionally, the M numbers of first images has a spatial-domain frequency in the second range. For example, the second range is greater than a maximum spatial-domain frequency recognizable by the naked eye. In another example, the second range is within a range of spatial-domain frequency recognizable by the video recorder. Therefore, the second modulated video viewed by the naked eye is the original video superimposed by a background image of a single grayscale and a single color, the naked eye cannot recognize any superimposed first images of the M numbers of first images (e.g. b1, b2 b3, ..., b60). Therefore, the second modulated video does not have any effect on viewer's viewing experience. However, for video recorder which can recognize images in a wider range of time-domain frequency and a wider range of spatial-domain frequency, any first images (e.g. b1, b2 b3, ..., b60) of the M numbers of first images has a time-domain frequency in the third range which is within a range of time-domain frequency recognizable by the video recorder, and any first images (e.g. b1, b2 b3, ..., b60) of the M numbers of first images has a spatial-domain frequency in the second range which is within a range of spatial-domain frequency recognizable by the video recorder. Therefore, when the video recorder records the second modulated video, it can record the artifact images of any first images (e.g. b1, b2 b3, ..., b60) of the M numbers of first images. The second modulated video does not affect the viewing experience of the naked eye but disturb the record result of the video recorder, which can help to protect the content of the video and enhance the security to play the video.

In some embodiments, in the two methods of video displaying mentioned in FIG. 7 and FIG. 8, subsequent to superimposing, the first images form a background image of a single grayscale and a single color. When the background image is viewed by the naked eye, the background images looks like a background image of a single grayscale and a single color. In one example, the single grayscale of the superimposed first images is set at a medium-high gray level. For example, the single grayscale of the superimposed first images is in a range of approximately 128 to approximately 255, e.g. approximately 128 to approximately 150, approximately 150 to approximately 200, approximately 200 to approximately 255. In another example, the background image formed by the superimposed first images is dark color, e.g. grey, black or other dark colors. Therefore, the contrast between the frame images of original video and the background image formed by the superimposed first images is enhanced, which can improve the viewing experience by the naked eye.

In some embodiments, the N numbers of times frequency multiplication performed on the original video is 2 times frequency multiplication. Optionally, the N numbers of times frequency multiplication performed on the original video is a frequency multiplication greater than 4 times, e.g., a 3 times frequency multiplication, a 4 times frequency multiplication, a 5 times frequency multiplication, and a frequency multiplication greater than 5 times.

In some embodiments, referring to FIG. 1, FIG. 7 and FIG. 8, subsequent to applying the first frequency modulation in time domain on an original video thereby obtaining a first modulated video (applying the first frequency modulation includes performing N numbers of times frequency multiplication on the original video to obtain a third modulated video having a video frame rate in a third range) and applying the second frequency modulation in spatial domain on the first modulated video, a second modulated video is obtained. The second modulated video includes a first invisible-light image. In some embodiments, displaying the second modulating video with the corresponding frame rate includes displaying the second modulating video according to a video frame sequence and the video frame rate of the third modulated video.

The original video has an established video frame sequence. Any two adjacent frame images of the original video contain a first adjacent frame image and a second adjacent frame image. Subsequent to applying the first frequency modulation in time domain (e.g., frequency multiplication) on an original video, any frame image identical to the first adjacent frame image is added between the first adjacent frame image and the second adjacent frame image, or between the first adjacent frame image and a preceding adjacent frame image; any frame image identical to the second adjacent frame image is added between the first adjacent frame image and the second adjacent frame image, or between the second adjacent frame image and a next adjacent frame image. Optionally, subsequent to obtaining a second modulated video, the second modulated video is played according to the video frame rate of the third modulated video. The second modulated video is played in a video frame sequence corresponding to the video frame sequence of the original video.

In one example, the original video contains 60 images and the frame rate of the original video is 60 Hz. The video frame sequence of the original video is a1, a2, a3, . . . , a60. Subsequent to performing 2 times frequency multiplication on the original video, a third modulated video is obtained. Therefore, the video frame sequence of the third modulated video is a1, a1, a2, a2, a3, a3, . . . , a60, a60. Thus, the third modulated video has a video frame sequence corresponding to the video frame sequence of the original video. Subsequently, the second frequency modulation is applied on the third modulated video with the video frame sequence of the third modulated video unchanged. Optionally, one sub-frame images of the N numbers of continuous sub-frame images in a respective one group of the M groups of frame images with a respective one of M number of first images is replaced with the video frame sequence of the third modulated video unchanged. Therefore, keeping the video frame sequence of the third modulated video unchanged guarantees that the content the naked eye saw is identical to the content of the original video, which prevents the disorder of frame images of the video. The third modulated video should be played according to the video frame rate of the third modulated video, so that the third modulated video provides the same viewing experience as the original video. Otherwise, there will cause streaking.

In some embodiments, subsequent to obtaining the second modulated video, the video displaying method includes simultaneously projecting a modulation light onto a video image when displaying the second modulated video. Optionally, the time-domain frequency of the modulation light is greater than a maximum time-domain frequency recognizable by the naked eye, and the time-domain frequency of the modulation light is within a range of time-domain frequency recognizable by a video recorder. Optionally, the spatial-domain frequency of the modulation light is greater than a maximum spatial-domain frequency recognizable by the naked eye, and the spatial-domain frequency of the modulation light is within a range of spatial-domain frequency recognizable by a video recorder.

In some embodiment, simultaneously projecting the modulation light onto a video image when displaying the second modulated video includes projecting the modulation light flickering at a preset frequency which is controlled by the light source of the modulation light. By controlling the flickering frequency of the modulation light, a preset image is superimposed onto the video image when displaying the second modulated video. For example, the preset image is a bright and dark striped pattern, which has the blocking effect on the video image. Optionally, the flickering frequency of the modulation light is greater than a maximum time-domain frequency recognizable by the naked eye, and is within a range of time-domain frequency recognizable by a video recorder. Optionally, the spatial-domain frequency of the preset image is greater than a maximum spatial-domain frequency recognizable by the naked eye, and is within a range of spatial-domain frequency recognizable by a video recorder. Therefore, when displaying the video image projected with the modulation light, the naked eye cannot recognize the superimposed preset image, but the video recorder cannot record a clear and complete image, which further prevent the piracy of videos, and enhance the security of the content of the video.

In some embodiments, the time-domain frequency of the first images is greater than 24 Hz. It is verified by experiments that when the refresh rate of an image reaches 24 Hz, the naked eye cannot recognize the refresh action.

As discussed above, the range of the WOV of the video recorder is wider than the range of the WOV of the naked eye. When the time-domain frequency of the first images is in a range of approximately 300 Hz to approximately 400 Hz, the naked eye cannot recognize the first images, but the video recorder can record the first images, which strongly disturb the recording result.

In some embodiments, not only that the time-domain frequency of the first images is greater than a maximum time-domain frequency recognizable by the naked eye and is within a range of time-domain frequency recognizable by a video recorder, but also the spatial-domain frequency of the first images is greater than a maximum spatial-domain frequency recognizable by the naked eye and is within a range of spatial-domain frequency recognizable by a video recorder. The range of the spatial-domain frequency recognizable by the video recorder is wider than the range of the spatial-domain frequency recognizable by the naked eye. Optionally, the spatial-domain frequency of the first images is set approximately in the middle of the range of the spatial-domain frequency recognizable by the video recorder, which can increase the interference to the video recorder. For example, the spatial-domain frequency of the first images is set in a range of approximately 60c/deg to approximately 200c/deg, e.g. approximately 60c/deg to approximately 100c/deg, approximately 100c/deg to approximately 150c/deg, approximately 150c/deg to approximately 200c/deg.

In some embodiments, the first images can be any of the patterns or any combination of the patterns including words, stripe, two-dimensional barcode, or other pattern with preset content. For example, the first images can be any of the patterns making people feel uncomfortable. For example, the first images can be any of the patterns containing information about the showtimes and locations of the original videos.

FIG. 9 is a schematic diagram illustrating a structure of a video displaying apparatus in some embodiments according to the present disclosure. Referring to FIG. 9, the video displaying apparatus in some embodiments includes a display apparatus 100 and a modulator 200. Optionally, the modulator 200 is used to apply a first frequency modulation in time domain on an original video thereby obtaining a first modulated video. Optionally, the modulator 200 is used to apply a second frequency modulation in spatial domain on the first modulated video thereby obtaining a second modulated video comprising a first invisible-light image. Optionally, the display apparatus 100 is used to play the second modulating video with a corresponding frame rate.

In some embodiments, the process of modulate the time-domain frequency and the spatial-domain frequency can be performed by a stand-alone modulator. Optionally, the modulator 200 is disposed separately from the display apparatus 100. Optionally, the modulator 200 is disposed inside the display apparatus 100. Optionally, the process of modulating the time-domain frequency and the spatial-domain frequency can be finished by a software (e.g. modulating software). Optionally, the process of modulate the time-domain frequency and the spatial-domain frequency can be finished by a hardware.

In some embodiments, the time-domain frequency and the spatial-domain frequency of the first images are respectively greater than a maximum time-domain frequency and a maximum spatial-domain frequency recognizable by the naked eye, but the time-domain frequency and the spatial-domain frequency of the first images are respectively within a range of time-domain frequency and a range of spatial-domain frequency recognizable by the video recorder, therefore, the video recorder will record a video showing the first images, but there is no effect on the viewing experience by the naked eye, which effectively prevent the piracy of videos, and enhance the security of the content of the video.

Examples of the display apparatus 100 include a projection apparatus, a liquid crystal display apparatus, an organic light emitting diode display apparatus, and an electronic paper display apparatus. The modulation processes in different types of display apparatuses may be performed in different manners.

Figure 10:
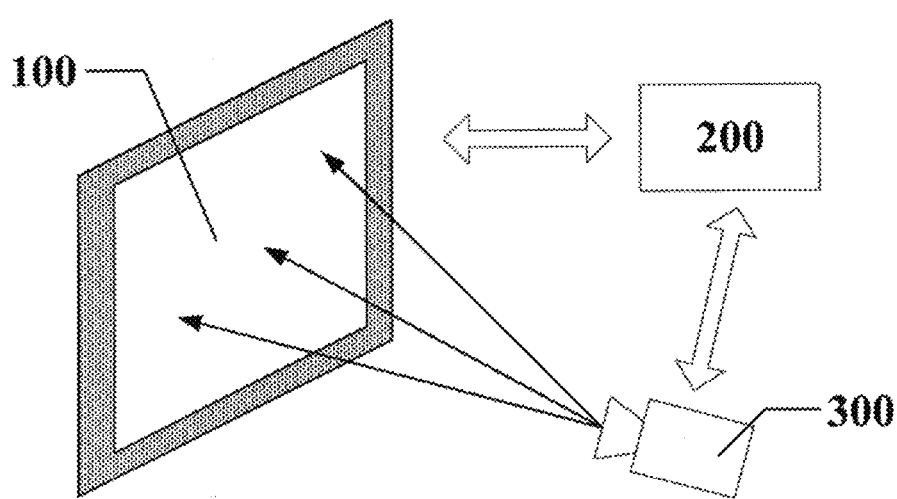
FIG. 10 is a schematic diagram illustrating a structure of a video displaying apparatus in some embodiments according to the present disclosure.

FIG. 10 is a schematic diagram illustrating a structure of a video displaying apparatus in some embodiments according to the present disclosure. Referring to FIG. 10, the video displaying apparatus further includes a light projecting device 300 coupled to the modulator 200. Optionally, the modulator 200 can apply frequency modulation in time-domain or in spatial-domain on the light projected by the light projecting device 300, so that the modulation light is projected onto the video image when displaying a video.

In some embodiments, a stand-alone modulator can be used to modulate light from the light projecting device 300. Optionally, the light projecting device 300 can share the same modulator 200 with the display apparatus 100. In one example, the modulator 200 can separately modulate the original video and/or modulate the light projected by the light projecting device 300. In another example, the modulator 200 can modulate the original video and the light protected by the light projecting device 300 at the same time, which can further increase the security of the content of the video by disturbing the piracy recording of the video recorder without affecting the viewing experiences of the naked eye.

In some embodiments, the display apparatus 100 is a liquid crystal display apparatus. The liquid crystal display apparatus includes a backlight. Optionally, the modulator 200 is used to modulate the time-domain frequency and the spatial-domain frequency of the light emitted from the backlight. The process of modulating the time-domain frequency and the spatial-domain frequency of the light emitted from the backlight device is similar to the process of modulate the time-domain frequency and the spatial-domain frequency of the light projected by the light projecting device 300.

In some embodiments, the display apparatus 100 is a projection apparatus. Optionally, the projection apparatus is a projection apparatus with digital light processing (DLP) whose core element is a high reflection aluminum micromirror of a digital micromirror device (DMD). The DMD device is a bi-stable spatial light modulator that consists of sets of movable micromirrors that can be mounted in a CMOS memory cell. Each of the movable micromirrors is independently controlled. Video data is uploaded to the high reflection aluminum micromirror mounted in the CMOS memory cell, thereby mapping the pixel of the video data in spatial domain onto the pixel in display apparatus. Video data controls the inclined angle of the high reflection aluminum micromirror in a binary manner, e.g., the inclined angle of the high reflection aluminum micromirror is +x° or −x°. For example, x° is 12°. After reflected by the high reflection aluminum micromirror, the reflected light is projected to the screen by projection lens. Light is reflected to create a dark field, which also defines the black layer of the image. The images are created by a switch modulating the grayscale, and the frame rate of the images (speed of the images) is fast enough for the observer to integrate the images. Because the DLP projection system can project binary images with a speed up to 9523 Hz, when adopting the DLP projection system, assuming that the critical flickering frequency recognizable by the naked eye is 60 Hz, the display frequency of 9523 Hz can produce 150 frame images per second (e.g. 150 Hz), therefore the naked eye will not recognize the flickering of images. By adopting the projection apparatus with digital light processing, a better display effect can be achieved.

In some embodiments, two light projecting devices 300 are used. For example, one of the two light projecting device 300 is used to play original video, and the other one of the two light projecting device 300 is used to play the video containing the first images, which can reach the effect of modulating the original video.

In some embodiments, the video displaying apparatus includes a display apparatus; a memory; and one or more processors. The memory and the one or more processors are connected with each other. In some embodiments, the memory stores computer-executable instructions for controlling the one or more processors to apply a first frequency modulation in time domain on an original video thereby obtaining a first modulated video; and apply a second frequency modulation in spatial domain on the first modulated video thereby obtaining a second modulated video comprising a first invisible-light image. Optionally, a time-domain frequency of the first invisible-light image is in a first range unrecognizable by the naked eye and recognizable by a video recorder. Optionally, a spatial-domain frequency of the first invisible-light image is in a second range unrecognizable by the naked eye and recognizable by a video recorder. Optionally, the display apparatus is configured to play the second modulating video with a corresponding frame rate. Optionally, the first range is greater than a maximum time-domain frequency recognizable by the naked eye, and is within a range of time-domain frequency recognizable by a video recorder. Optionally, the second range is greater than a maximum spatial-domain frequency recognizable by the naked eye, and is within a range of spatial-domain frequency recognizable by the video recorder.

In some embodiments, the memory further stores computer-executable instructions for controlling the one or more processors to apply the first frequency modulation comprises performing N numbers of times frequency multiplication on the original video to obtain a third modulated video having a video frame rate in a third range. Optionally, N≥2. Optionally, the video frame rate is N times a video frame rate of the original video. Optionally, a respective one of frame images in the original video is converted into N numbers of continuous sub-frame images. Optionally, the third range is greater than a maximum video frame rate recognizable by the naked eye and within a range recognizable by the video recorder.

In some embodiments, the memory further stores computer-executable instructions for controlling the one or more processors to divide frame images in the third modulated video into N equivalent groups of frame images, the N numbers of continuous sub-frame images converted from the respective one of the frame images of the original video are respectively grouped into the N equivalent groups of frame images; and superimpose N numbers of first images respectively onto the N equivalent groups of frame images, the N numbers of first images being different from each other. Optionally, a superimposed image of adjacent first images of the N numbers of first images constitutes a background image of a single grayscale and a single color. Optionally, a respective one of the N numbers of first images has a spatial-domain frequency in the second range. Optionally, the second range is greater than a maximum spatial-domain frequency recognizable by the naked eye, and is within a range of spatial-domain frequency recognizable by the video recorder.

In some embodiments, the memory further stores computer-executable instructions for controlling the one or more processors to divide frame images in the third modulated video into M groups of frame images, a respective one group of the M groups of frame images comprising the N continuous sub-frame images converted from a respective one of the frame images of the original video; and replace one sub-frame images of the N continuous sub-frame images in the respective one group of the M groups of frame images with a respective one of M numbers of first images. Optionally, M is a total number of frame images in the original video. Optionally, the M numbers of first images being different from each other, sub-images of any two different groups of the M groups of frame images being replaced by two different first images of the M numbers of first images. Optionally, a superimposed image of adjacent first images of the M numbers of first images constitutes a background image of a single grayscale and a single color. Optionally, the respective one of the M numbers of first images has a spatial-domain frequency in the second range. Optionally, the second range is greater than a maximum spatial-domain frequency recognizable by the naked eye, and is within a range of spatial-domain frequency recognizable by the video recorder.

In some embodiments, the display apparatus is configured to play the second modulated video according to a video frame sequence and the video frame rate of the third modulated video.

In some embodiments, the video displaying apparatus further includes a projection apparatus configured to project a modulation light onto a video image when displaying the second modulated video. Optionally, a time-domain frequency of the modulation light is in a range unrecognizable by the naked eye and recognizable by a video recorder. Optionally, a spatial-domain frequency of the modulation light is in a range unrecognizable by the naked eye and recognizable by a video recorder. Optionally, the time-domain frequency of the modulation light is greater than a maximum time-domain frequency recognizable by the naked eye, and is within a range of time-domain frequency recognizable by a video recorder. Optionally, the spatial-domain frequency of the modulation light is greater than a maximum spatial-domain frequency recognizable by the naked eye, and is within a range of spatial-domain frequency recognizable by the video recorder.

Optionally, the time-domain frequency of the first invisible-light image is greater than 24 Hz. Optionally, the first range is approximately 300 Hz to approximately 400 Hz. Optionally, the second range is approximately 60 c/deg to approximately 200 c/deg. Optionally, the first invisible-light image is one or a combination of a word, a stripe, and a two-dimensional barcode.

In another aspect, the present disclosure provides a computer-program product including a non-transitory tangible computer-readable medium having computer-readable instructions thereon. In some embodiments, the computer-readable instructions are executable by a processor to cause the processor to perform applying a first frequency modulation in time domain on an original video thereby obtaining a first modulated video; and applying a second frequency modulation in spatial domain on the first modulated video thereby obtaining a second modulated video comprising a first invisible-light image. Optionally, a time-domain frequency of the first invisible-light image is in a first range unrecognizable by the naked eye and recognizable by a video recorder. Optionally, a spatial-domain frequency of the first invisible-light image is in a second range unrecognizable by the naked eye and recognizable by a video recorder. Optionally, the first range is greater than a maximum time-domain frequency recognizable by the naked eye, and is within a range of time-domain frequency recognizable by a video recorder. Optionally, the second range is greater than a maximum spatial-domain frequency recognizable by the naked eye, and is within a range of spatial-domain frequency recognizable by the video recorder.

In some embodiments, the computer-readable instructions are executable by a processor to cause the processor to further perform N numbers of times frequency multiplication on the original video to obtain a third modulated video having a video frame rate in a third range. Optionally, N≥2. Optionally, the video frame rate is N times a video frame rate of the original video. Optionally, a respective one of frame images in the original video is converted into N numbers of continuous sub-frame images. Optionally, the third range is greater than a maximum video frame rate recognizable by the naked eye and within a range recognizable by the video recorder.

In some embodiments, the computer-readable instructions are executable by a processor to cause the processor to further perform dividing frame images in the third modulated video into N equivalent groups of frame images, the N numbers of continuous sub-frame images converted from the respective one of the frame images of the original video are respectively grouped into the N equivalent groups of frame images; and superimposing N numbers of first images respectively onto the N equivalent groups of frame images, the N numbers of first images being different from each other. Optionally, a superimposed image of adjacent first images of the N numbers of first images constitutes a background image of a single grayscale and a single color. Optionally, a respective one of the N numbers of first images has a spatial-domain frequency in the second range. Optionally, the second range is greater than a maximum spatial-domain frequency recognizable by the naked eye, and is within a range of spatial-domain frequency recognizable by the video recorder.

In some embodiments, the computer-readable instructions are executable by a processor to cause the processor to further perform dividing frame images in the third modulated video into M groups of frame images, a respective one group of the M groups of frame images comprising the N continuous sub-frame images converted from a respective one of the frame images of the original video; and replacing one sub-frame images of the N continuous sub-frame images in the respective one group of the M groups of frame images with a respective one of M numbers of first images. Optionally, M is a total number of frame images in the original video. Optionally, the M numbers of first images being different from each other, sub-images of any two different groups of the M groups of frame images being replaced by two different first images of the M numbers of first images. Optionally, a superimposed image of adjacent first images of the M numbers of first images constitutes a background image of a single grayscale and a single color. Optionally, a respective one of the M numbers of first images has a spatial-domain frequency in the second range. Optionally, the second range is greater than a maximum spatial-domain frequency recognizable by the naked eye, and is within a range of spatial-domain frequency recognizable by the video recorder.

Optionally, the time-domain frequency of the first invisible-light image is greater than 24 Hz. Optionally, the first range is approximately 300 Hz to approximately 400 Hz. Optionally, the second range is approximately 60 c/deg to approximately 200 c/deg. Optionally, the first invisible-light image is one or a combination of a word, a stripe, and a two-dimensional barcode.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A video displaying method, comprising:
    applying a first frequency modulation in time domain on an original video thereby obtaining a first modulated video;
    applying a second frequency modulation in spatial domain on the first modulated video thereby obtaining a second modulated video comprising a first invisible-light image; and
    displaying the second modulating video with a corresponding frame rate;
    wherein a time-domain frequency of the first invisible-light image is in a first range unrecognizable by a naked eye and recognizable by a video recorder; and
    a spatial-domain frequency of the first invisible-light image is in a second range unrecognizable by the naked eye and recognizable by a video recorder;
    wherein applying the first frequency modulation comprises performing N numbers of times frequency multiplication on the original video to obtain a third modulated video having a video frame rate in a third range;
    wherein N≥2;
    the video frame rate is N times a video frame rate of the original video; and
    a respective one of frame images in the original video is converted into N numbers of continuous sub-frame images.

2. The video displaying method of claim 1, wherein the first range is greater than a maximum time-domain frequency recognizable by the naked eye, and is within a range of time-domain frequency recognizable by a video recorder; and the second range is greater than a maximum spatial-domain frequency recognizable by the naked eye, and is within a range of spatial-domain frequency recognizable by the video recorder.

3. The video displaying method of claim 1, wherein the third range is greater than a maximum video frame rate recognizable by the naked eye and within a range recognizable by the video recorder.

4. The video displaying method of claim 1, wherein applying the second frequency modulation comprises:

dividing frame images in the third modulated video into N equivalent groups of frame images, the N numbers of continuous sub-frame images converted from the respective one of the frame images of the original video are respectively grouped into the N equivalent groups of frame images; and superimposing N numbers of first images respectively onto the N equivalent groups of frame images, the N numbers of first images being different from each other;

wherein a superimposed image of adjacent first images of the N numbers of first images constitutes a background image of a single grayscale and a single color; and a respective one of the N numbers of first images has a spatial-domain frequency in the second range.

5. The video displaying method of claim 4, wherein the second range is greater than a maximum spatial-domain frequency recognizable by the naked eye, and is within a range of spatial-domain frequency recognizable by the video recorder.

6. The video displaying method of claim 1, wherein applying the second frequency modulation comprises:

dividing frame images in the third modulated video into M groups of frame images, a respective one group of the M groups of frame images comprising the N continuous sub-frame images converted from a respective one of the frame images of the original video; and replacing one sub-frame images of the N continuous sub-frame images in the respective one group of the M groups of frame images with a respective one of M numbers of first images;

wherein M is a total number of frame images in the original video;

the M numbers of first images being different from each other, sub-images of any two different groups of the M groups of frame images being replaced by two different first images of the M numbers of first images;

wherein a superimposed image of adjacent first images of the M numbers of first images constitutes a background image of a single grayscale and a single color; and the respective one of the M numbers of first images has a spatial-domain frequency in the second range.

7. The video displaying method of claim 6, wherein the second range is greater than a maximum spatial-domain frequency recognizable by the naked eye, and is within a range of spatial-domain frequency recognizable by the video recorder.

8. The video displaying method of claim 1, wherein displaying the second modulated video with the corresponding frame rate comprises displaying the second modulated video according to a video frame sequence and the video frame rate of the third modulated video.

9. The video displaying method of claim 1, further comprising simultaneously projecting a modulation light onto a video image when displaying the second modulated video;

wherein a time-domain frequency of the modulation light is in a range unrecognizable by the naked eye and recognizable by a video recorder; and a spatial-domain frequency of the modulation light is in a range unrecognizable by the naked eye and recognizable by a video recorder.

10. The video displaying method of claim 9, wherein the time-domain frequency of the modulation light is greater than a maximum time-domain frequency recognizable by the naked eye, and is within a range of time-domain frequency recognizable by a video recorder; and the spatial-domain frequency of the modulation light is greater than a maximum spatial-domain frequency recognizable by the naked eye, and is within a range of spatial-domain frequency recognizable by the video recorder.

11. The video displaying method of claim 1, wherein the time-domain frequency of the first invisible-light image is greater than 24 Hz.

12. The video displaying method of claim 11, wherein the first range is approximately 300 Hz to approximately 400 Hz.

13. The video displaying method of claim 1, wherein the second range is approximately 60 c/deg to approximately 200 c/deg.

14. The video displaying method of claim 1, wherein the first invisible-light image is one or a combination of a word, a stripe, and a two-dimensional barcode.

15. A video displaying apparatus, comprising:

a display apparatus;

a memory; and one or more processors;

wherein the memory and the one or more processors are connected with each other; and the memory stores computer-executable instructions for controlling the one or more processors to:

apply a first frequency modulation in time domain on an original video thereby obtaining a first modulated video; and apply a second frequency modulation in spatial domain on the first modulated video thereby obtaining a second modulated video comprising a first invisible-light image;

wherein a time-domain frequency of the first invisible-light image is in a first range unrecognizable by a naked eye and recognizable by a video recorder; and a spatial-domain frequency of the first invisible-light image is in a second range unrecognizable by the naked eye and recognizable by a video recorder;

wherein the display apparatus is configured to play the second modulating video with a corresponding frame rate;

the memory further stores computer-executable instructions for controlling the one or more processors to apply the first frequency modulation by performing N numbers of times frequency multiplication on the original video to obtain a third modulated video having a video frame rate in a third range;

N≥2;

the video frame rate is N times a video frame rate of the original video; and a respective one of frame images in the original video is converted into N numbers of continuous sub-frame images.

16. The video displaying apparatus of claim 15, wherein the memory further stores computer-executable instructions for controlling the one or more processors to:

divide frame images in the third modulated video into N equivalent groups of frame images, the N numbers of continuous sub-frame images converted from the respective one of the frame images of the original video are respectively grouped into the N equivalent groups of frame images; and superimpose N numbers of first images respectively onto the N equivalent groups of frame images, the N numbers of first images being different from each other;

wherein a superimposed image of adjacent first images of the N numbers of first images constitutes a background image of a single grayscale and a single color; and a respective one of the N numbers of first images has a spatial-domain frequency in the second range.

17. The video displaying apparatus of claim 15, wherein the memory further stores computer-executable instructions for controlling the one or more processors to:

divide frame images in the third modulated video into M groups of frame images, a respective one group of the M groups of frame images comprising the N continuous sub-frame images converted from a respective one of the frame images of the original video; and replace one sub-frame images of the N continuous sub-frame images in the respective one group of the M groups of frame images with a respective one of M numbers of first images;

wherein M is a total number of frame images in the original video;

the M numbers of first images being different from each other, sub-images of any two different groups of the M groups of frame images being replaced by two different first images of the M numbers of first images;

wherein a superimposed image of adjacent first images of the M numbers of first images constitutes a background image of a single grayscale and a single color; and the respective one of the M numbers of first images has a spatial-domain frequency in the second range.

18. A computer-program product comprising a non-transitory tangible computer-readable medium having computer-readable instructions thereon, the computer-readable instructions being executable by a processor to cause the processor to perform:

applying a first frequency modulation in time domain on an original video thereby obtaining a first modulated video; and applying a second frequency modulation in spatial domain on the first modulated video thereby obtaining a second modulated video comprising a first invisible-light image;

wherein a time-domain frequency of the first invisible-light image is in a first range unrecognizable by a naked eye and recognizable by a video recorder; and a spatial-domain frequency of the first invisible-light image is in a second range unrecognizable by the naked eye and recognizable by a video recorder;

wherein applying the first frequency modulation comprises performing N numbers of times frequency multiplication on the original video to obtain a third modulated video having a video frame rate in a third range;

wherein N≥2;

the video frame rate is N times a video frame rate of the original video; and a respective one of frame images in the original video is converted into N numbers of continuous sub-frame images.

* * * * *